(12) United States Patent
Burkholder et al.

(10) Patent No.: US 6,685,362 B2
(45) Date of Patent: Feb. 3, 2004

(54) SHIELDED ADAPTER ASSEMBLY

(75) Inventors: Matthew Burkholder, Lititz, PA (US); David Erdman, Hummelstown, PA (US); Michael Gurreri, York, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 09/817,230

(22) Filed: Mar. 26, 2001

(65) Prior Publication Data

US 2001/0048790 A1 Dec. 6, 2001

Related U.S. Application Data

(60) Provisional application No. 60/191,982, filed on Mar. 24, 2000.

(51) Int. Cl.[7] ................................. G02B 6/36
(52) U.S. Cl. .......................... 385/78; 439/607
(58) Field of Search ................ 385/78, 76, 53, 385/92; 439/607

(56) References Cited

U.S. PATENT DOCUMENTS

| | | | |
|---|---|---|---|
| 4,345,808 A | * 8/1982 | Ingham | 439/138 |
| 5,363,460 A | 11/1994 | Marazzi et al. | 385/70 |
| 5,708,745 A | * 1/1998 | Yamaji et al. | 372/33 |
| 6,004,043 A | 12/1999 | Abendschein et al. | 385/76 |
| 6,039,585 A | * 3/2000 | Kim et al. | 385/139 |
| 6,108,482 A | * 8/2000 | Roth | 385/139 |
| 6,179,477 B1 | 1/2001 | De Marchi | 385/56 |
| 6,206,577 B1 | * 3/2001 | Hall et al. | 385/53 |
| 6,240,229 B1 | * 5/2001 | Roth | 385/53 |
| 6,276,839 B1 | 8/2001 | De Marchi | 385/53 |

* cited by examiner

*Primary Examiner*—Khiem Nguyen

(57) ABSTRACT

An adapter comprising: (a) a housing having a front and a rear orientation and walls to define a port configured for receiving a mating plug assembly and an opening through the rear of the port, the walls comprising at least two opposing walls; and (b) two shutters, each shutter having a proximate end and a distal end, each shutter being attached at its proximate end to one of the opposing walls with its distal end extending rearwardly, the shutters being biased inwardly toward the interior of the port such that, when the adapter is unmated, the shutters meet at an angle α to at least partially shield the opening and, when the adapter is mated with a plug, the plug contacts the shutters and pivots them outwardly.

25 Claims, 3 Drawing Sheets

SECTION A-A

SHIELDED ADAPTER ASSEMBLY

RELATED APPLICATION

This application is based on U.S. provisional application No. 60/191,982 filed on Mar. 24, 2000, which is hereby incorporated by reference.

FIELD OF INVENTION

This invention relates generally to the field of fiber optics, and, more specifically, to plug-receiving adapters which have shielding to restrict access thereto when unmated.

BACKGROUND OF THE INVENTION

In the optical fiber field, there is a need to connect the optical transmission path of a fiber or device to that of another fiber or device. Often this connection is effected by inserting a plug into an adapter. As used herein, the term "adapter" refers to any structure that facilitates fiber/fiber, device/fiber and device/device interconnections. An adapter generally comprises a housing having a port which is configured to receive and hold the housing of a plug to facilitate the plug's optical connection with another plug or a device connected to the structure. The plug typically comprises a housing which contains a ferrule or other means for holding and precisely positioning one or more fiber ends. When the plug is inserted in the adapter, the adapter and plug are "mated." Likewise, when the plug is not inserted in the adapter, the adapter and plug are "unmated." Specific types of adapters include, for example, connector couplings which facilitate the connection of two plugs. Such couplings may have various configurations (e.g., simplex, duplex and quad) for use in various applications (e.g., backplane and through-chassis interconnections). Another important type of adapter includes those that are attached to or integral with a device to facilitate the optical connection between the plug and the device. Typical devices include, for example, active devices, such as transceivers and transmitters, and passive devices, such as attenuators and multiplexers/demultiplexers.

Although conventional adapters are effective in facilitating connections with plugs, certain problems arise when adapters are connected to a fiber or device on one side but left unmated on the other side thereby leaving their port(s) exposed. One problem in particular is contamination of the fiber or device connected to the unmated adapter. More specifically, if the port is exposed, the fiber or device connected to the adapter may be damaged by adverse environmental hazards such as dust and dirt. Such hazards impair the optical performance of the fiber or device. Another significant problem with an unmated adapter is the emission of dangerous laser light when the device or fiber to which the adapter is connected is "active" and emitting light. Such emissions may pose a significant risk to eyes. Consequently, when an adapter is unmated, it is advantageous to cover its port(s) to prevent dust and other debris from collecting and/or damaging the fiber or device connected to the adapter, and to prevent uncontrolled light emissions.

It is known to provide a dust cover for the adapter port for use during transport or storage or at other times when the adapter is not in use. The use of dust covers, however, presents other problems. For example, such caps may result in light energy being reflected into sensitive optical components causing them damage. More specifically, if an active fiber or device is emitting light along an optical transmission path in an unmated condition, the cap may reflect this light back down the optical transmission path and damage the light-generating component, e.g., a laser, at the other end of the path. Consequently, while an end cap may protect the fiber from dust, dirt and damage from the external environment, it may create perhaps a greater problem by reflecting light energy back into the system.

Another problem with dust covers and end caps is the inconvenience associated with removing them when attempting to mate the adapter with a plug assembly. Furthermore, these covers are misplaced or otherwise not available when the plug assembly is unmated with the adapter, thereby leaving the adapter unprotected and subject to the problems described above.

Problems associated with removable covers were addressed in U.S. Pat. No. 6,004,043 to Abendschein et al. ("Abendschein"), which has the same assignee as the present application. Abendschein discloses a door which is mounted to the adapter housing and is pushed back against the housing wall upon insertion of a plug assembly. Accordingly, the adapter must have adequate room to accommodate the swing radius of the door. However, as industry pressure forces adapters to conform to smaller size limits, it becomes increasingly more difficult to accommodate this swing radius. For example, due to its length, the Abendschein design cannot be used in an adapter which is configured to receive an SC duplex plug.

Therefore, there is a need for a shielded adapter which is convenient and safe to use and which is compact and suitable for miniaturization. The present invention fulfills this need among others.

SUMMARY OF INVENTION

The present invention provides for a protective adapter that overcomes the aforementioned problems by using opposing shutters in the port rather than a single door or removable cover. The opposing shutters are biased inwardly (i.e., toward the interior of the port) and are configured to meet at an angle when the adapter is unmated. Therefore, when the adapter is unmated, the shutters effectively form a shield to prevent debris from entering the port while preventing laser light from escaping.

The fact that the shutters close at an angle also offers a number of advantages. In particular, any light energy transmitted from a fiber or device coupled to the unmated adapter will be deflected away from the optical transmission path of the fiber or device. This eliminates the risk of light being reflected back down the optical transmission path and damaging the light source. Preferably, the shutters are angled such that they contact the robust housing of the mating plug and pivot away to avoid contact with and/or damage to the plug's sensitive ferrule.

The use of two shutters also provides for a reduction in adapter size requirements due to the diminished space required to accommodate the swing radius of the shutters. More specifically, since two shutters are used, neither shutter needs to span the entire distance across the port as a single shutter approach requires. This results in shorter shutters having shorter swing radii. By reducing the swing radius of each shutter, the entire adapter can be made smaller.

Accordingly, one aspect of the present invention is an adapter having opposing shutters. In a preferred embodiment, the adapter comprises: (a) a housing having a front and a rear orientation and walls to define a port configured for receiving a mating plug assembly and an opening through the rear of the port, the walls comprising at least two opposing walls; and (b) two shutters, each shutter having a proximate end and a distal end, each shutter being pivotally connected at its proximate end to one of the opposing walls with its distal end extending rearwardly, the shutters being biased inwardly toward the interior of the port such that, when the adapter is unmated, the shutters meet at an angle α to at least partially shield the opening and, when the adapter is being mated with a plug, the plug contacts the shutters and pivots them outwardly.

Another aspect of the invention is an interconnection system comprising the adapter of the present invention in combination with one or more plugs.

Yet another aspect of the invention is a device comprising the adapter of the present invention.

BRIEF DESCRIPTION OF THE DRAWINGS

FIG. 3 is a perspective view of a preferred embodiment of a shutter of the adapter of FIG. 1a;

FIG. 4 is a perspective view of a preferred embodiment of an opposing shutter of the adapter of FIG. 1a; and FIG. 5 is a perspective view of a preferred embodiment of the resilient means of the adapter of FIG. 1a.

DETAILED DESCRIPTION OF THE PREFERRED EMBODIMENT

Figure 1A:
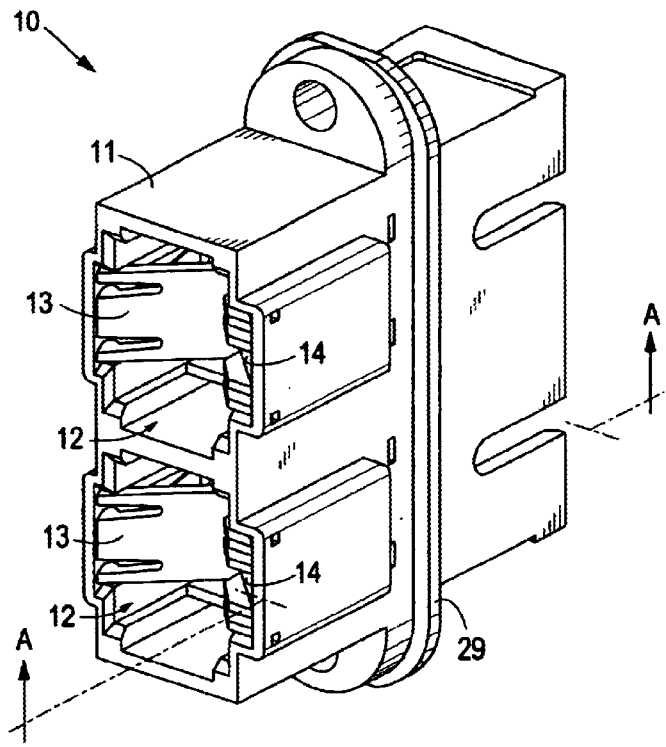
FIG. 1a is a front perspective view of a preferred embodiment of an adapter in accordance with the present invention.
Figure 1B:
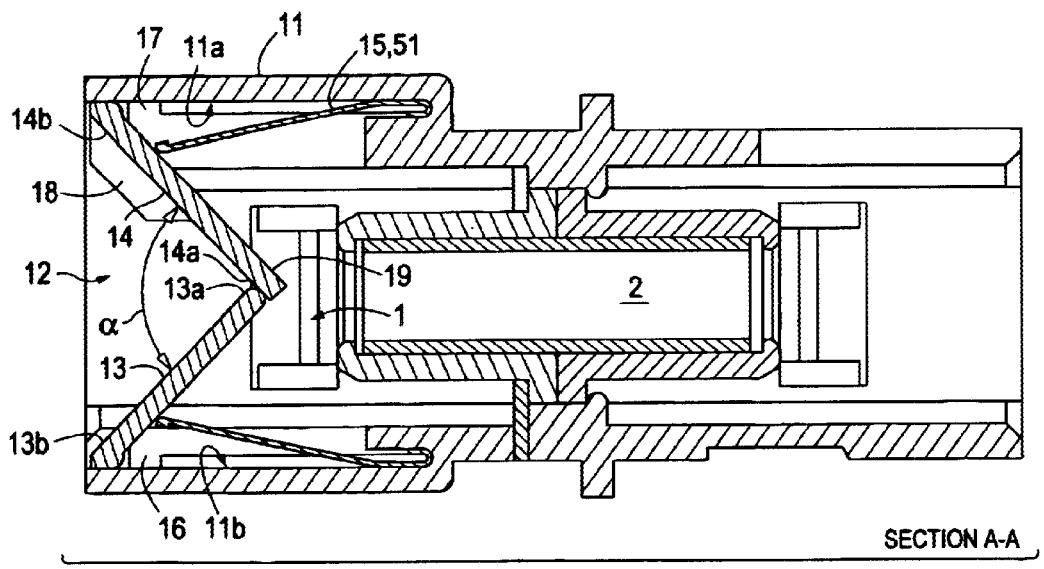
FIG. 1b is a cross-sectional view of the adapter of FIG. 1a, taken along line A—A.

FIGS. 1a and 1b show a preferred embodiment of an adapter 10 in accordance with the present invention. The adapter 10 comprises a housing 11 which has a front and rear orientation and walls to define one or more ports 12 adapted to receive a plug and an opening 1 at the rear of each port. Although a duplex adapter is described herein in detail, the present invention is not limited to this configuration and can be practiced with any adapter as broadly defined earlier in this application. In the embodiment shown in FIG. 1a, the housing 11 includes a flange 29 encircling the housing 11. The flange 29 is configured to overlap a panel cutout through which the adapter is to be mounted. In some applications, it may be preferable for the flange to be conductive to enhance protection of EMI radiation escaping through the panel cutout.

Mounted to the adapter 10 are opposing shutters 13 and 14 for each port 12. Shutters 13, 14 have distal ends 13a, 14a, and proximate ends 13b, 14b, respectively. The proximate ends of the shutters are pivotally connected to opposing walls 11a, 11b of the housing 11 and the shutters are biased inwardly (i.e., toward the interior of the port) such that the distal ends 13a and 14a of shutters 13 and 14, respectively, meet at an angle α to limit access to the opening 1 from the external environment.

Figure 3:
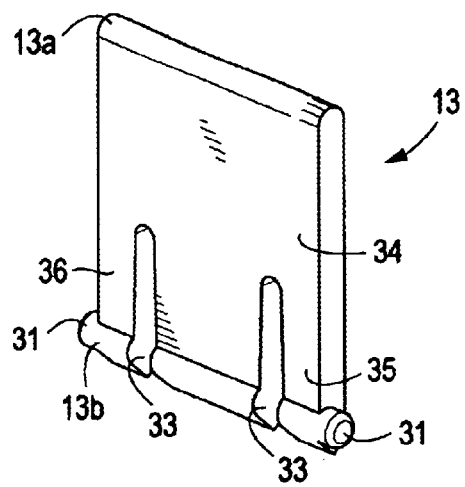

FIG. 3 shows a preferred embodiment of shutter 13. As shown, shutter 13 comprises an essentially planar surface 34 having a proximate end 13b and a distal end 13a. The proximate end 13b is adapted to be pivotally mounted to the housing 11. To this end, a pin-like structure 31 is molded into the shutter. Although pivotal mounting is preferred, it should be understood that other configurations for mounting the shutter to the housing can be employed including, for example, a hinge or a resilient connection between the shutter and the housing. It is even within the scope of the invention for the shutter to be integral with the housing providing that the shutter is biased inwardly and can be pushed outwardly toward the housing wall. The shutter 13 also comprises slots 33 extending from the proximate end 13b approximately half the length of the shutter. The slots 33 impart compliance to portions 35, 36 of the shutter 13 bearing the pin-like structures 31. This compliance allows the portions 35, 36 to deflect inward during installation of the shutters in the housing 11. Once the pin-like structures are aligned with receiving apertures (not shown) on the housing 11, the portions 35, 36 return to their relaxed position and, in so doing, cause the pin-like structures to seat in the receiving apertures and thereby effect a hinge connection of the shutter 13 to the housing 11.

Figure 4:
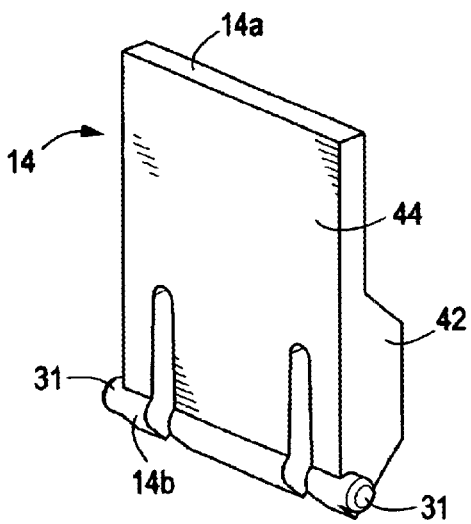

FIG. 4 shows a preferred embodiment of the shutter 14 which cooperates with shutter 13 to close the port 12 of the adapter 10. This shutter is substantially the same as that of FIG. 3 except it comprises two sections 42 that extend normally from a substantial planar portion 44 of the shutter 14. The two sections 42 defines a notch there between for accommodating a key portion of a plug (see FIG. 2). The key portion and sections 42 ensure that the mating plug assembly is inserted in the adapter 10 in the proper orientation.

The shutters and housing may comprise a variety of materials including plastics, metals, and ceramics depending upon the application and the desired properties. For example, it may be preferable to use plastic which is readily molded and suitable for commercialization. On the other hand, it may be desirable to use a conductive material such as a die-cast metal (e.g., zinc alloy) which offers EMI protection. Furthermore, it is contemplated that a metalized coating may be applied to a non-conductive material to provide the desired conductivity for EMI purposes. It is worthwhile to note that if EMI protection is desired, housing 11 should have a conductive path between the shutters and ground. Such conductive paths are well known in the art. In a preferred embodiment, the housing comprises a conductive material to provide such a conductive path.

In the embodiment shown in FIG. 1, the adapter includes resilient means 15 for biasing the shutters inwardly, although, as mentioned above, it is within the scope of the invention that the attachment configuration of the shutters 13, 14 of the housing may have inherent resiliency to urge the shutters inwardly. The resilient means may include, for example, helical torsion and leaf springs or elastic hinges. A leaf spring is preferred however, due to its low profile relative to other resilient means such as a helical spring which has a certain diameter that prevents it from lying substantially flat along the wall of housing. With respect to FIG. 1, the leaf springs 51 are held by the housing 11 and capable of lying substantially flush with the housing 11 when the shutter is opened fully such that it is pushed into pockets 16 and 17. This arrangement is addressed in greater detail with respect to FIG. 2.

Figure 5:
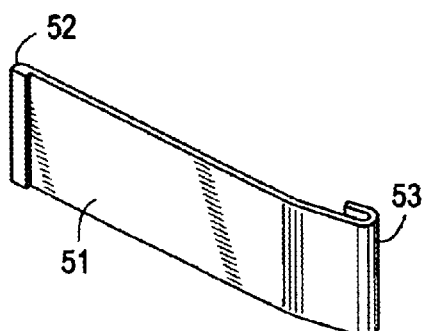

The leaf spring 51 of the embodiment of FIG. 1 a is shown in detail in FIG. 5. Such a leaf spring may be stamped and formed from flat metal stock. The leaf spring 51 preferably has a rounded edge 53 and an upturned edge 52. The upturned edge 52 is inserted into an opening in the housing 11 to form an interference fit with the housing. The rounded edge 53 prevents the leaf spring 15 from catching or scraping along the shutter and permits it to ride freely along the surface of a shutter to inwardly bias and allow pivoting of the shutter.

Using a dual set of shutters has a number of important attributes. First, when the adapter 10 is unmated, the shutters serve to at least partially cover and protect opening 1 which leads to the ferrule-receiving bore 2. As is well known in the industry, the ferrule-receiving bore is configured to contain a ferrule assembly which is a delicate component and susceptible to dust and dirt. It should be understood, however, that rather than a ferrule-receiving bore, the adapter of the present invention may be used to protect other sensitive optical components.

In addition to keeping debris from entering the opening 1, the shutters also reduce the risk of laser light escaping from the opening 1 and perhaps damaging a person's eyes. To provide further closure of the opening 1, a conventional-type dust cover or end cap may be optionally applied to the adapter 10.

The fact that the shutters 13, 14 close at an angle α also has a number of important advantages. In particular, when the adapter is unmated, the shutters are at an angle to the optical transmission path of any active fiber or component connected to the adapter. Therefore, this angle causes any light energy transmitted from a fiber or device coupled to the adapter to be deflected away from the optical transmission path and thereby avoid the risk of being reflected back down the optical transmission path and damaging the light source.

Figure 2A:
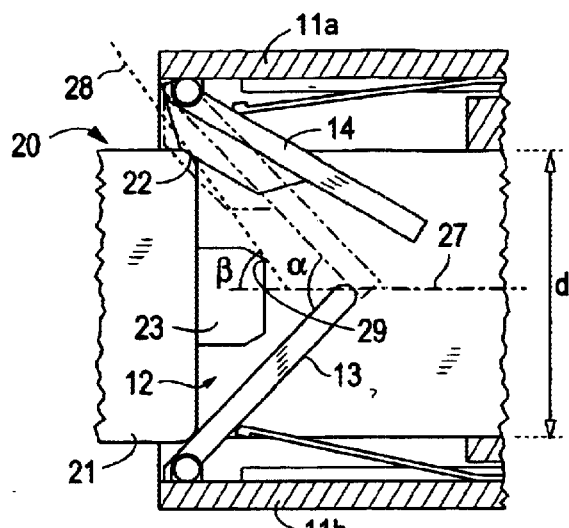
FIGS. 2a–2c are top sectional views of a mating sequence between the adapter of FIG. 1a and a plug.
Figure 2B:
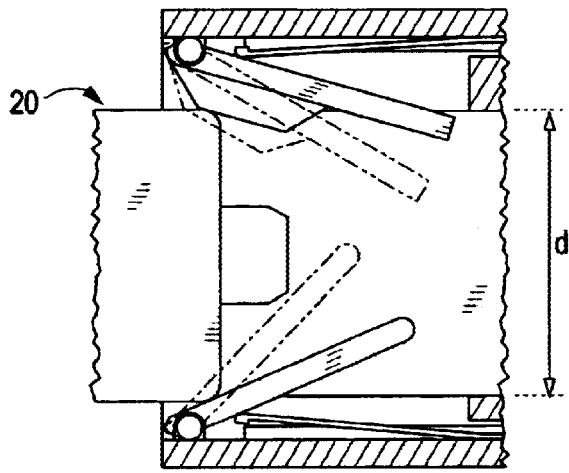
Figure 2C:
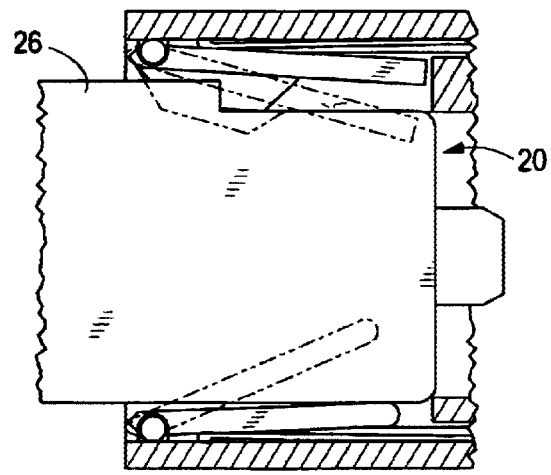

Furthermore, the angle α is such that the shutters are designed to contact the robust housing of the plug and pivot away from the mating plug assembly to avoid contact with and/or damage to its more sensitive portion, e.g., the ferrule. More specifically, with reference to the insertion sequence shown in FIGS. 2a–c, as the plug 20 is inserted into the housing 11, the housing 21 of the mating plug assembly 20 contacts the shutters 13, 14 and pivots them outwardly toward the housing wall 11a or 11b and out of the way of the plug's sensitive ferrule 23. Because sections 42 protrude normally from the planar portion 44 of the shutter 14, they make contact with the housing 21 earlier than shutter 13 and so the shutter 14 pivots first. Likewise, during removal of the plug 20 from the adapter 10, sections 42 cause shutter 14 to close after shutter 13. The opening and closing sequences provided by sections 42 ensure secure contact of shutters 13 and 14 and a predictable overlap of shutter 14 over shutter 13 as shown in FIG. 2a.

In the embodiment described herein, to ensure that the housing 21 contacts the shutters 13, 14 before the ferrule 23, the angle α should be less than twice the angle β formed from the axis 27 of the plug to the line 28 (dotted) from the outermost forward edge 29 of the plug's ferrule 23 to the outermost forward edge 22 the housing. Typically, angle α ranges from about 60° to about 120°. Preferably the angle is less than about 100°, and, more preferably, less than about 95°.

The use of two shutters also provides for a reduction in size requirements. More specifically, since two shutters are used, each shutter 13, 14 has a length from the prominent end to the distal end that is less than the distance d across the port 12 (see FIG. 2). As used herein, the distance d across the port is measured as the minimum distance between the opposing walls 11a, 11b. Preferably, the length of the shutters is less than about 90% of the distance d. Accordingly, the swing radius of the shutters is considerably less than that of a single shutter door of the prior art which must be at least as long as distance d and typically longer to account for its attachment to the housing. This is an important distinction over prior art approaches and allows an adapter of the present invention to be used in small form factor configurations.

The adapter of the present invention is also well suited for small form factor applications due to the orientation of the shutters with respect to the connector retaining latches. Specifically, referring to FIG. 1b, connector retainer latches 19 are shown in the port of the adapter 10. (It should be appreciated that, since this is a cross sectional view of the adapter taken between the two latches, only one latch is shown. The other latch is a mirror image of the one shown.) Connector retainer latches are typically resilient members which are configured to resiliently interengage a plug that is inserted into the adapter. This is a well-known mechanism to physically secure the plug to the adapter.

Although connector retaining latches are well known, the orientation of the shutters 13 and 14 to the connector retainer latches 19 is an important aspect of the present invention. Specifically, the shutters 13 and 14 are orthogonal to the connector retainer latches 19. This way, the shutters move at a 90° angle with respect to the movement of the connector retainer latches 19. Such a configuration is important as it allows the components to move without interfering with one another. For example, referring to FIG. 1b, if a plug were to be inserted into the adapter, shutter 14 would pivot upwardly, shutter 13 would pivot downwardly, the connector retainer latch 19 (shown in the drawing) would deflect into the page while the corresponding connector retainer latch (not shown) would deflect away from the page. Since the orthogonal orientation of the shutters to the connector retaining latches allows the components to move without interfering with one another, the components can be packaged compactly without the need to accommodate for the swing of the shutters. As shown, the shutters 13 and 14 extend rearwardly such that their distal ends 13a, 14a are between the connector retaining latches 19 when the shutters are in a closed position. Since the shutters and latches are overlapping along the length of the adapter, rather than being in tandem, the length of the adapter can be minimized. Such a configuration is particularly applicable in small form factor designs and duplex connectors.

What is claimed is:

1. An adapter in combination with a plug having a plug housing and a ferrule, which, in its unmated state, protrudes from said plug housing, said adapter comprising:

a housing having a front and a rear orientation and defining a port configured for receiving a mating plug assembly, said port having an opening through the rear thereof said port, said housing comprising at least two opposing walls;

connector retaining latches in said port for interengaging said plug to secure said plug to said housing; and two shutters, each shutter having a proximate end and a distal end, each shutter being attached at its proximate end to one of said opposing walls with its distal end extending rearwardly such that its distal end is between said connector retaining latches when said adapter is unmated, said shutters being biased inwardly toward the interior of said port such that, when said adapter is unmated, said shutters meet at an angle α to at least partially shield said opening, during mating, said plug housing contacts said shutters and pivots them outwardly such that they avoid contact with said ferrule.

2. The adapter of claim 1, wherein said angle α is less than twice the angle formed from the axis of the plug to the line from the outermost forward edge of the plug's ferrule to the outermost forward edge of the housing.

3. The adapter of claim 2, wherein said angle α is between about 60° and about 120°.

4. The adapter of claim 3, wherein said angle α is less than about 100°.

5. The adapter of claim 1, wherein each shutter has a length from said proximate end to said distal end which is less than a distance across said port.

6. The adapter of claim 5, wherein the length of each shutter is less than about 90% of the distance across said port.

7. The adapter of claim 1, wherein each shutter is conductive and said adapter comprises a conductive path from said shutters to ground.

8. The adapter of claim 7, wherein each shutter comprises a die-cast metal.

9. The adapter of claim 7, wherein each shutter comprises a plastic having a metalized coating.

10. The adapter of claim 1, wherein each shutter is biased inwardly by a resilient member connected to said housing.

11. The adapter of claim 10, wherein said resilient member is a leaf spring.

12. The adapter of claim 11, wherein said housing defines a slot and said leaf spring comprises an upturned end and wherein said leaf spring is connected to said housing by an interference fit between said upturned end and said slot.

13. The adapter of claim 1, wherein each shutter is attached to said housing by a hinge pin.

14. The adapter of claim 13, wherein each shutter defines one or more slots and comprises an outwardly extending pin-like structure adjacent a slot, and wherein said pin-like structures are received in apertures defined by said housing.

15. The adapter of claim 1, wherein one of said shutters comprises a planar portion and sections protruding from said planar portion to define a notch therebetween for receiving a key portion of a plug.

16. The adapter of claim 1, further comprising a flange encircling said housing for overlapping with a cutout of a panel through which the adapter is to be mounted.

17. An adapter assembly comprising:

a plug having a plug housing and a ferrule, which, in its unmated state protrudes from said plug housing;

a housing having a front and a rear orientation and defining a port configured for receiving a mating plug assembly, said port defining an opening through the rear thereof, said housing comprising at least two opposing walls;

connector retaining latches in said port for interengaging said plug to secure said plug to said housing; and two shutters, each shutter having a proximate end and a distal end, each shutter being pivotally connected to one of said opposing walls at its proximate end with its distal end extending rearwardly such that its distal end is between said connector retaining latches when said adapter is unmated, said shutters being biased inwardly toward the interior of said port such that, when said adapter is unmated, said shutters meet at an angle α to at least partially shield said opening, during mating, said plug housing contacts said shutters and pivots them outwardly such that they avoid contact with said ferrule.

18. The adapter of claim 17, wherein said shutters meet at an angle α which is less than twice the angle formed from the axis of the plug to the line from the outermost forward edge of the plug's ferrule to the outermost forward edge of the housing.

19. The adapter of claim 17, wherein the length of each shutter is less than about 90% of the distance across said port.

20. The adapter of claim 1, wherein said shutters are orthogonal to said connector retaining latches.

21. The adapter of claim 17, wherein said shutters are orthogonal to said connector retaining latches.

22. An adapter in combination with a multiplug assembly, each plug having a plug housing and a ferrule, which, in its unmated state, protrudes from said plug housing, said adapter comprising:

a housing having a front and a rear orientation and defining a plurality of ports, each port configured for receiving a plug of said multiplug assembly, each port having an opening through the rear thereof, said housing comprising at least two opposing walls; and two shutters for each port, each shutter having a proximate end and a distal end, each shutter being attached at its proximate end to one of said opposing walls with its distal end extending rearwardly, the shutters of each port being biased inwardly toward the interior of the port such that, when said adapter is unmated, the shutters meet at an angle α to at least partially shield the opening in the port, during mating, a plug housing contacts the shutters and pivots them outwardly such that they avoid contact with the ferrule of the plug.

23. The adapter of claim 22, wherein said adapter is a duplex adapter for receiving a duplex plug.

24. The adapter of claim 22, further comprising connector retaining latches disposed in said port, wherein the distal end of each shutter is disposed between said connector retaining latches when said adapter is unmated.

25. The adapter of claim 24, wherein said shutters are orthogonal to said connector retaining latches.

* * * * *